(12) United States Patent
Noessing et al.

(10) Patent No.: US 9,225,825 B2
(45) Date of Patent: Dec. 29, 2015

(54) METHOD AND APPARATUS FOR LINE TESTING

(75) Inventors: Gerhard Noessing, Villach (AT); Alberto Canella, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 2810 days.

(21) Appl. No.: 11/590,981

(22) Filed: Oct. 31, 2006

(65) Prior Publication Data

US 2008/0101550 A1  May 1, 2008

(51) Int. Cl.
*H04M 3/30* (2006.01)

(52) U.S. Cl.
CPC ........................... *H04M 3/306* (2013.01)

(58) Field of Classification Search
USPC ............... 379/1.01, 1.03, 1.04, 10.02, 22, 379/22.01–22.03, 22.07, 22.08, 23, 24, 379/27.01, 27.03, 27.08, 29.01, 29.04, 30, 379/31; 324/500, 512, 519, 522, 525, 527
See application file for complete search history.

(56) References Cited

U.S. PATENT DOCUMENTS

| | | | |
|---|---|---|---|
| 3,904,839 A | | 9/1975 | Peoples |
| 4,634,964 A | * | 1/1987 | Chattler ........................ 324/628 |
| 5,202,882 A | | 4/1993 | Rudolf |
| 5,625,667 A | | 4/1997 | Vogt, III et al. |
| 5,867,557 A | | 2/1999 | D'Andrea et al. |
| 5,870,451 A | | 2/1999 | Winkler et al. |
| 5,881,129 A | | 3/1999 | Chen et al. |
| 5,881,130 A | | 3/1999 | Zhang |
| 6,453,016 B1 | | 9/2002 | Chea, Jr. |
| 6,519,322 B1 | | 2/2003 | Ludeman |
| 6,587,544 B2 | | 7/2003 | Nossing et al. |
| 6,590,962 B1 | | 7/2003 | Groessl et al. |
| 6,909,781 B1 | | 6/2005 | Itri |
| 8,081,736 B2 | | 12/2011 | Blechschmidt et al. |
| 8,102,970 B2 | | 1/2012 | Noessing et al. |
| 9,025,733 B2 | | 5/2015 | Noessing et al. |
| 2002/0101980 A1 | | 8/2002 | Ayoub et al. |
| 2002/0114444 A1 | | 8/2002 | Anderson et al. |
| 2002/0118819 A1 | | 8/2002 | Li |
| 2002/0141542 A1 | | 10/2002 | Angliss et al. |
| 2004/0062361 A1 | | 4/2004 | Kamali et al. |
| 2004/0109540 A1 | | 6/2004 | Forsberg |
| 2005/0117732 A1 | | 6/2005 | Arpin |
| 2005/0258841 A1 | * | 11/2005 | Blechschmidt et al. ...... 324/713 |
| 2006/0193444 A1 | | 8/2006 | Aufenast et al. |

(Continued)

FOREIGN PATENT DOCUMENTS

| EP | 0 808 053 | 11/1997 |
|---|---|---|
| EP | 0 580 947 | 5/1998 |
| EP | 1 219 097 | 4/2005 |

OTHER PUBLICATIONS

Final Office Action for U.S. Appl. No. 11/489,131 dated Oct. 4, 2010 (13 pages).

(Continued)

*Primary Examiner* — Quoc D Tran (57) ABSTRACT

A method of testing a communication line includes applying a voltage as a function of time on the communication line and measuring at least a first current and a second current flowing via the communication line. The second current is measured at a different point in time than the first current. The method includes deciding whether a given terminal element is connected to the communication line based on the first current and the second current.

35 Claims, 6 Drawing Sheets

(56) References Cited

U.S. PATENT DOCUMENTS

2007/0230667 A1    10/2007    Warner et al.
2008/0019486 A1    1/2008    Noessing et al.
2008/0025476 A1    1/2008    Noessing et al.

OTHER PUBLICATIONS

Office Action for U.S. Appl. No. 11/489,376 dated Oct. 13, 2010 (10 pages).
Office Action for U.S. Appl. No. 11/117,075 dated Jan. 12, 2009 (13 pages).
Office Action for U.S. Appl. No. 11/117,075 dated Aug. 10, 2009 (7 pages).
Office Action for U.S. Appl. No. 11/489,131 dated Apr. 14, 2010 (11 pages).
Office Action for U.S. Appl. No. 11/489,376 dated May 7, 2010 (9 pages).
Office Action for U.S. Appl. No. 11/117,075 dated Oct. 4, 2010 (9 pages).
Notice of Allowance for U.S. Appl. No. 11/489,376 mailed Jan. 5, 2015 (5 pgs.).
Decision on Appeal for U.S. Appl. No. 11/489,376 mailed Oct. 27, 2014 (13 pgs.).
Examiner's Answer for U.S. Appl. No. 11/489,376 mailed Oct. 31, 2011 (11 pgs.).
Final Office Action for U.S. Appl. No. 11/489,376 mailed Mar. 22, 2011 (9 pgs.).
Notice of Allowance for U.S. Appl. No. 11/489,131 mailed Sep. 29, 2011 (8 pgs.).
Final Office Action for U.S. Appl. No. 11/117,075 mailed Jan. 13, 2010 (6 pgs.).
Advisory Action for U.S. Appl. No. 11/117,075 mailed Apr. 19, 2010 (4 pgs.).
Office Action for U.S. Appl. No. 11/117,075 mailed Mar. 10, 2011 (7 pgs.).
Notice of Allowance for U.S. Appl. No. 11/117,075 mailed Aug. 23, 2011 (6 pgs.).

\* cited by examiner

METHOD AND APPARATUS FOR LINE TESTING

CROSS-REFERENCE TO RELATED APPLICATIONS

This application is related to commonly assigned U.S. patent application Ser. No. 11/489,131, filed on Jul. 18, 2006, entitled "METHOD AND APPARATUS FOR LINE TESTING,", and U.S. patent application Ser. No. 11/489,376, filed on Jul. 18, 2006, entitled "METHOD AND APPARATUS FOR LINE TESTING," which are both herein incorporated by reference.

BACKGROUND

In general, line testing is employed in wired communication networks for line testing of the respective communication lines. In such communication networks, terminal devices located in the premises of a customer (also referred to as subscriber) are connected with a central office via such communication lines. An example for a corresponding communication network is a public switched telephone network (PSTN) wherein terminal devices like telephones or facsimile devices are connected with the central office via a pair of copper lines. The copper lines are commonly referred to as tip line and ring line. In the recent years, data transfer services, such as integrated services digital network (ISDN) or digital subscriber line (DSL) (e.g., asymmetric digital subscriber line (ADSL)) have been employed over these copper lines, for example to provide access to the internet.

In such systems, in the central office the copper lines are usually connected with a subscriber line interface circuit (SLIC) on a corresponding line card which, depending on the services, is referred to as a PSTN line card, DSL line card, or the like.

SUMMARY

One embodiment provides a method of testing a communication line. The method includes applying a voltage as a function of time on the communication line. The method includes measuring at least a first current and a second current flowing via the communication line. The second current is measured at a different point in time than the first current. The method includes deciding whether a given terminal element is connected to the communication line based on the first current and the second current.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments relate to methods and apparatuses for line testing of communication lines.

In the following, methods and apparatuses for line testing according to embodiments will be described. In order to provide a clearer understanding of the embodiments, first an exemplary environment where the embodiments may be used will be described with reference to FIGS. 1-3.

Figure 1:
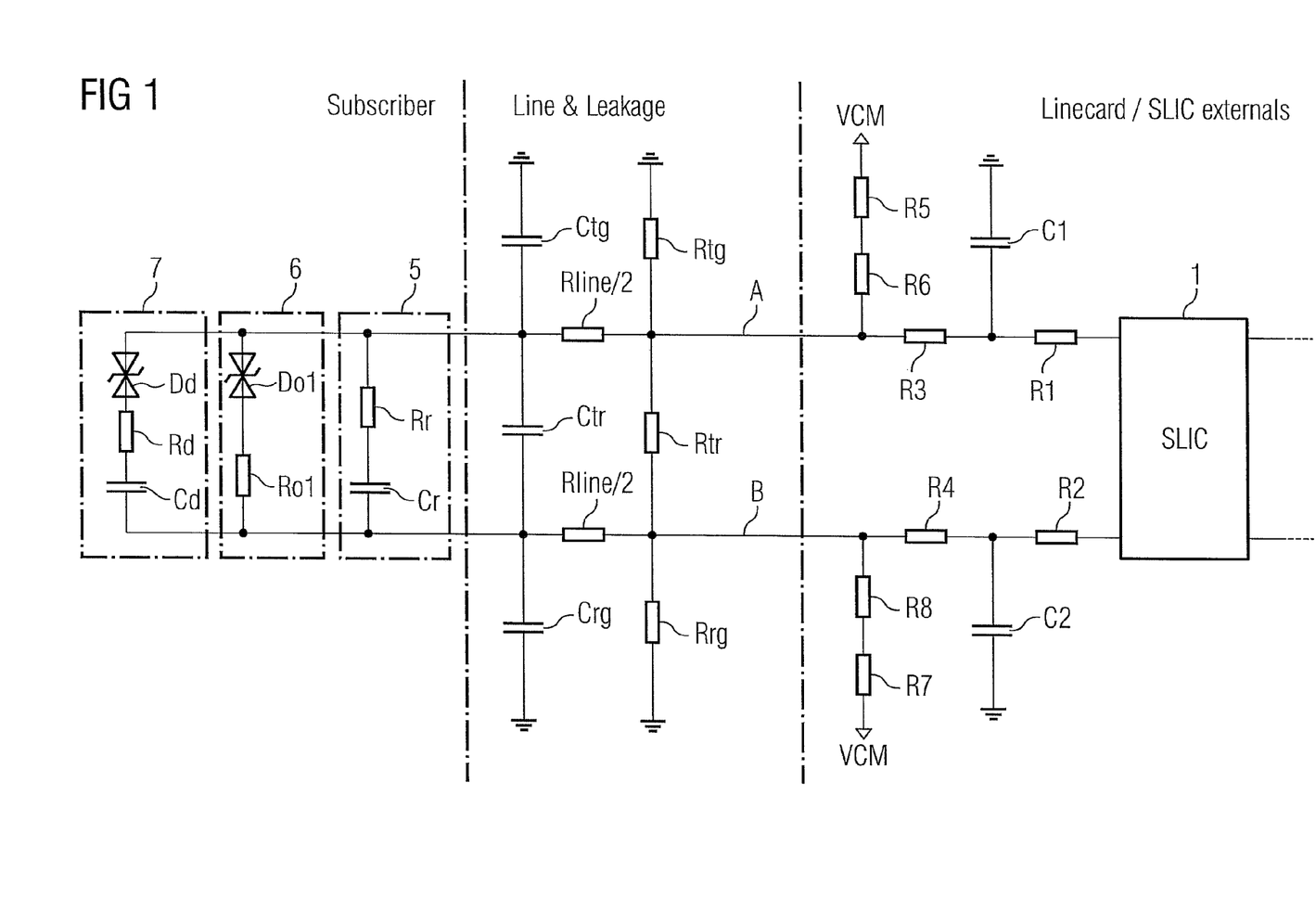
FIG. 1 illustrates an example embodiment of an equivalent circuit of a communication line.

In FIG. 1 illustrates an example equivalent circuit embodiment for a copper line pair comprising a tip line A and a ring line B between a line card located in a central office and a subscriber. The line card comprises a SLIC 1 and resistors R1-R7 and capacitances C1, C2 for connecting SLIC 1 to ring line A and tip line B. As explained further below in detail, line cards may comprise a plurality of subscriber line interface circuits and also other elements, such as coder/decoder (CO-DECs).

In the example circuit embodiment illustrated in FIG. 1, tip line A is connected to SLIC 1 via resistances R3 and R1, whereas ring line B is connected to SLIC 1 via resistances R4 and R2. Example suitable values are 30Ω for resistances R1 and R2 and 20Ω for resistances R3 and R4, although these values may be different in different embodiments. Furthermore, capacitances C1 and C2 are connected between tip line and ring line, respectively, on the one hand and ground on the other hand. An example suitable value for capacitances C1 and C2 is 15 nF.

Resistances R1 through R4 stabilize and protect SLIC 1 and together with capacitances C1 and C2 form filters for filtering out unwanted frequency components.

Furthermore, tip line A is coupled with a common mode voltage VCM via resistances R5 and R6, and ring line B is connected with common mode voltage VCM via resistances R8 and R7. Example suitable values are 10 MΩ for resistances R6 and R8 and 47 kΩ for resistances R5 and R7. As resistances R6 and R8 have large values, only negligible current flows between tip line A and VCM and ring line B and VCM. However, as will be explained later in more detail, R5 and R6 as well as R8 and R7 may serve as voltage dividers which enable a measurement of large voltages on tip line A and ring line B.

A section designated "line and leakage" in FIG. 1 includes the equivalent circuit of the copper line itself. Equivalent circuit in this case means that the intrinsic capacitances and resistances of the copper line A, B are depicted as separate capacitances and resistances.

In particular, two resistances each designated Rline/2 are illustrated in the "line and leakage" section of FIG. 1 representing the resistance of tip line A and ring line B, such that the overall resistance of the communication line is Rline.

Leak resistances and capacitances are also illustrated in the "line and leakage" section of FIG. 1, namely Rtg as a leak resistance between tip line A and ground, Ctg as a leak capacitance between tip line A and groung, Rrg as a leak resistance between ring B and ground, Crg as a leak capacitance between ring line B and ground, Rtr as a leak resistance between tip line A and ring line B, and Ctr as a leak capacitance between tip line A and ring line B. In a fault free state, the resistances Rtg, Rrg, and Rtr are very large (e.g., several tens of MΩ), and the capacitances Ctg, Crg, and Ctr are comparatively small (e.g., in the order of 47 nF per km of the line). Therefore, no significant direct current (DC) and only small alternating current (AC) currents may flow via these connections.

In addition to what is illustrated in FIG. 1, tip line A and/or ring line B may be accidentally connected to what is called a foreign voltage, for example if tip line A is connected with a copper wire of a different communication line such that the voltage applied to this different communication line is also coupled with tip line A. However, these foreign voltages are not necessary for the understanding of the described embodiments and will therefore be not discussed further here, but is discussed in detail in the above incorporated patent application Ser. No. 11/489,131. However, it should be noted that the described embodiments may be combined with methods or devices for evaluating, detecting and handling such connections to foreign voltages, for example by performing the necessary measurements one after the other.

As illustrated in FIG. 1, on a subscriber side (i.e., at a far end of tip line A and ring line B in customer's premises one or more terminal devices like telephones, DSL modems, facsimile devices, or the like may be present. Such devices have typical signatures or termination, three of which are depicted in FIG. 1. The termination of the line provided by a telephone in an on-hook state (i.e., a state where the telephone is inactive) is indicated at 5. In this case, the telephone may be represented by a resistance Rr and a capacitance Cr connected in series between tip line A and ring line B. In contrast, when the telephone is in an off-hook state, for example when a telephone call is made, the telephone may be represented by the equivalent circuit indicated at 6, with a pair of Zener diodes Do1 and a resistance Ro1 connected in series. Finally, if a DSL modem is present, a corresponding signature may be provided such that the presence of the DSL modem may be detected. An example for such a signature is indicated at 7 and comprises a pair of Zener diodes Dd, a resistor Rd, and a capacitance Cd connected in series. According to one embodiment, the DSL signature 7 may comprise Zener diodes with an example suitable breakthrough voltage of 6.8 V, a resistor Rd with an example suitable resistance of 33 kΩ, and a capacitance Cd having an example suitable value of 470 nF.

In the context of this application, the term "termination" designates the equivalent circuit of a device connected to a communication line, whereas "signature" designates elements provided to be connected to the communication line for identification purposes. A signature may form a termination or a part thereof, and electrically they are the same (i.e., they represent circuit elements connected to the communication line).

A Zener diode is a kind of breakthrough diode that permits current to flow in the forward direction like a normal diode, but also in the reverse direction if the voltage is larger than the specified breakdown voltage or Zener voltage. In contrast thereto, a conventional solid state diode will not permit current flow if reversed biased below its reverse breakdown voltage. If the breakdown voltage is exceeded, a conventional diode will be destroyed in the breakdown due to excess currents which cause overheating. A Zener diode is designed to have a reduced breakdown voltage, wherein the diode will not be destroyed when the breakdown voltage is reached. In other words, a reverse biased Zener diode will exhibit a controlled breakdown wherein the current flows to an extent to keep the voltage across the Zener diode at the Zener voltage (e.g., 6.8 V in case of a suitable example DSL signature 7 depicted in FIG. 1).

In the central office illustrated on the right side in FIG. 1, according to embodiments a "line testing" procedure is regularly performed to obtain data regarding the copper lines connected to the central office. In particular, in such line testing procedure the values of the capacitances and resistances in the "line and leakage" section of FIG. 1 may be measured, the values in turn then being used for detecting possible faults in the line, and the signatures and terminations in the customer's premises, for example those illustrated in the "subscriber" section of FIG. 1 may be detected so that, for example, the presence or absence of a DSL modem may be determined.

The embodiments which will be presented in the following relate primarily to the latter aspect (i.e., to determining a signature or termination), for example determining whether a DSL signature like signature 7 in FIG. 1 is present. However, when determining the signature, also information regarding the leakage capacitances and resistances may be obtained, and furthermore the embodiments presented may easily be combined with measurements for determining the leak resistances and capacitances illustrated to a greater extent.

Figure 2:
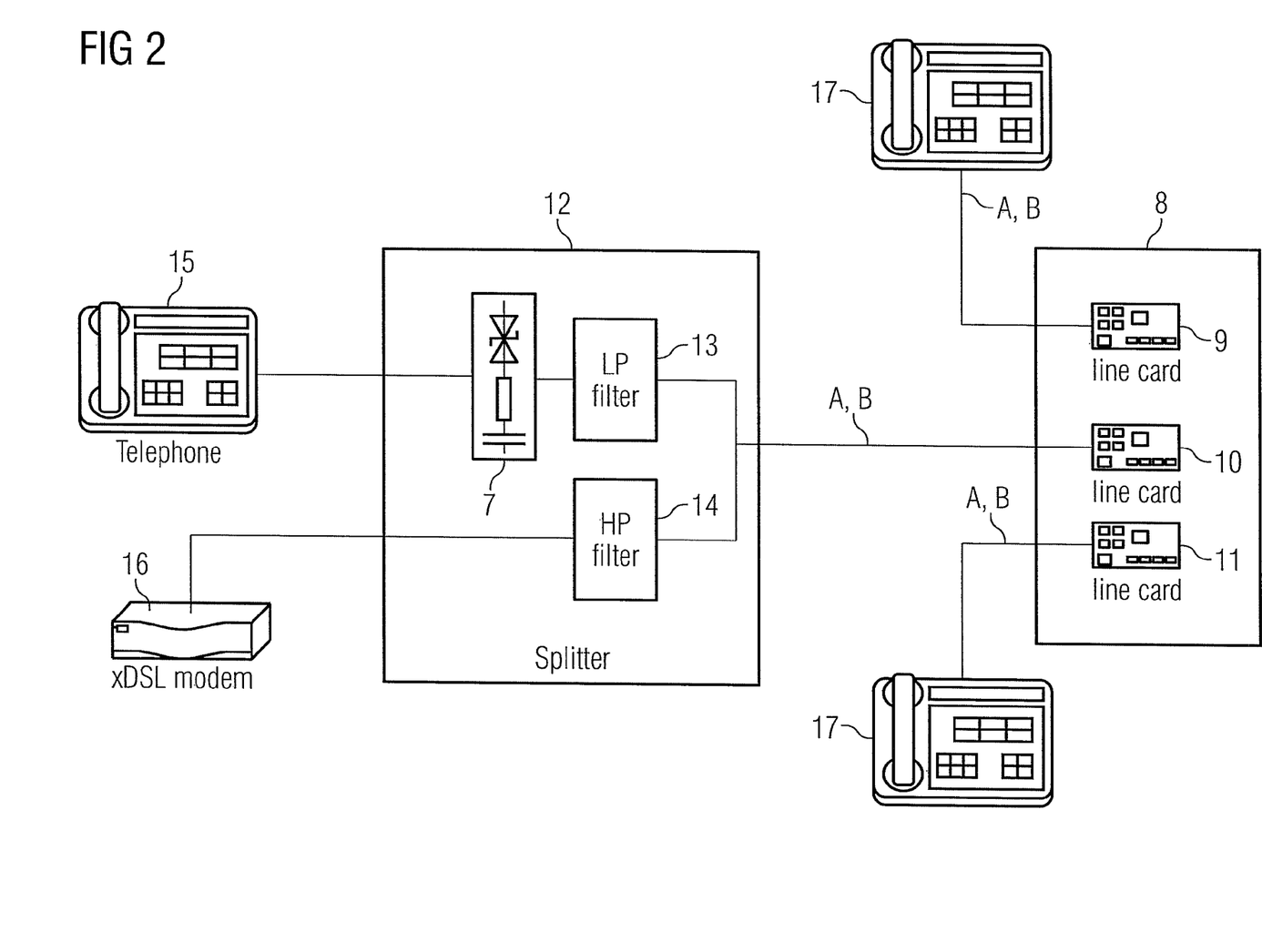
FIG. 2 illustrates an example embodiment of a communication system.

To illustrate embodiments more precisely, in FIG. 2 an example environment in which such embodiments are useful is depicted.

In particular, in a central office 8 illustrated in FIG. 2 a plurality of line cards 9, 10, 11 are provided, wherein line cards 9 and 11 are connected to respective telephones 17 via copper lines A, B like the copper lines A, B illustrated in FIG. 1. Telephones 17 may be located in customer's premises and, in an on-hook state, terminate lines A, B as indicated by 5 in FIG. 1.

Line card 10 is also connected via copper lines A, B with customer's premises. However, in this case both a telephone 15 and an xDSL modem, for example an ADSL modem 16, are connected to the copper lines A, B via a splitter 12. Such splitters have the function to provide a connected telephone like telephone 15 with the corresponding telephone signals and a DSL modem like xDSL modem 16 with the corresponding DSL signals. To achieve this, for example a low pass filter 13 and a high pass filter 14 are provided. These filters may be used since usually DSL signals are transmitted in frequency bands having higher frequencies than frequency bands for transmission of telephone signals.

Furthermore, in splitter 12 a DSL signature 7 corresponding to the DSL signature 7 of FIG. 1 is provided. With the help of this signature, embodiments may determine that a DSL modem is connected to line card 10. Therefore, when line testing is performed in central office 8, embodiments may determine which line cards are connected with telephones only and which line cards are connected to telephones and DSL modems. A further possibility is a line card only connected to a DSL modem, which is not illustrated in FIG. 2.

The embodiments of the present invention are not only applicable to central office equipment, but corresponding line cards or connections may also be located, for example, in a private branch exchange (PDX) which is a central unit for a telephone system, for example, of a company or a firm. Also, as already indicated, several terminal devices like telephones or DSL modems may be connected to a single line card, and of course more or less line cards than illustrated in FIG. 2 may be provided.

Figure 3A:
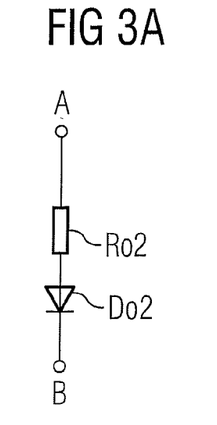
FIGS. 3A and 3B illustrate equivalent circuits of possible off-hook termination.
Figure 3B:
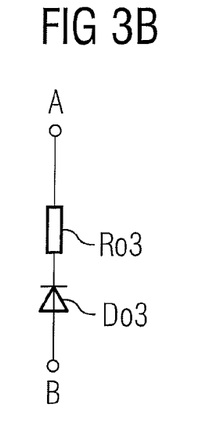

Different signatures from those illustrated in FIG. 1 exist. For example, FIGS. 3A and 3B illustrate two further possible off-hook terminations for telephones which may be present instead of the termination 6 of FIG. 1. The terminations illustrated in FIGS. 3A and 3B both comprise a resistor Ro2 or Ro3 and a diode Do2 or Do3 and differ in the polarity of the diode Do2, Do3 with respect to tip line A and ring line B.

In general, the embodiments discussed in the following apply voltages to tip line A and ring line B and measure currents flowing via tip line A and ring line B. Voltages may be applied as plateaus (i.e., constant voltages) or as ramps (i.e., varying voltages) or a combination of the two.

For detecting signatures like DSL signature 7 of FIG. 1, embodiments take the non-linear nature of the signature into account. For example, for the signature 7 of FIG. 1 or any other signature comprising a Zener diode or a similar device, measurements may be performed at a first voltage where a Zener diode or a similar element in a signature is in a non-conducting state and therefore decouples the signature from tip line A and ring line B, and a second voltage where the Zener diodes or other element is in a conducting state and therefore the signature is coupled to tip line A and ring line B, and currents flowing via the communication line may be measured at both first voltage and second voltage. Based on the currents measured, the presence of a signature may be determined.

The first voltage and second voltage may in particular be part of one or more voltage ramps from a respective starting voltage to a respective end voltage. A plurality of such voltage ramps having different slopes and/or different signs may be used within embodiments, for example to cancel out offsets.

In other embodiments, an element in a termination like the diodes Do2 and Do3 in FIGS. 3A and 3B may conduct current only in one direction. To determine such a termination, embodiments apply a first voltage having a first polarity to a corresponding communication line, apply a second voltage having a second polarity different from the first polarity to the communication lines, and measure the current flowing via the communication lines in both cases. Again, by comparing the currents measured, the presence of a corresponding termination or signature may be detected.

While in some embodiments the principle as described above may be carried out with dedicated test equipment comprising voltage sources and current meters for applying voltages to tip line A and ring line B and measuring corresponding currents, in other embodiments line cards which in normal operation are used for handling the communication via tip line A and ring line B are used for carrying out the measurement. In this case, no dedicated test equipment is needed, the embodiments may be implemented in a cost effective manner and therefore tests may be performed more frequently.

Figure 4:
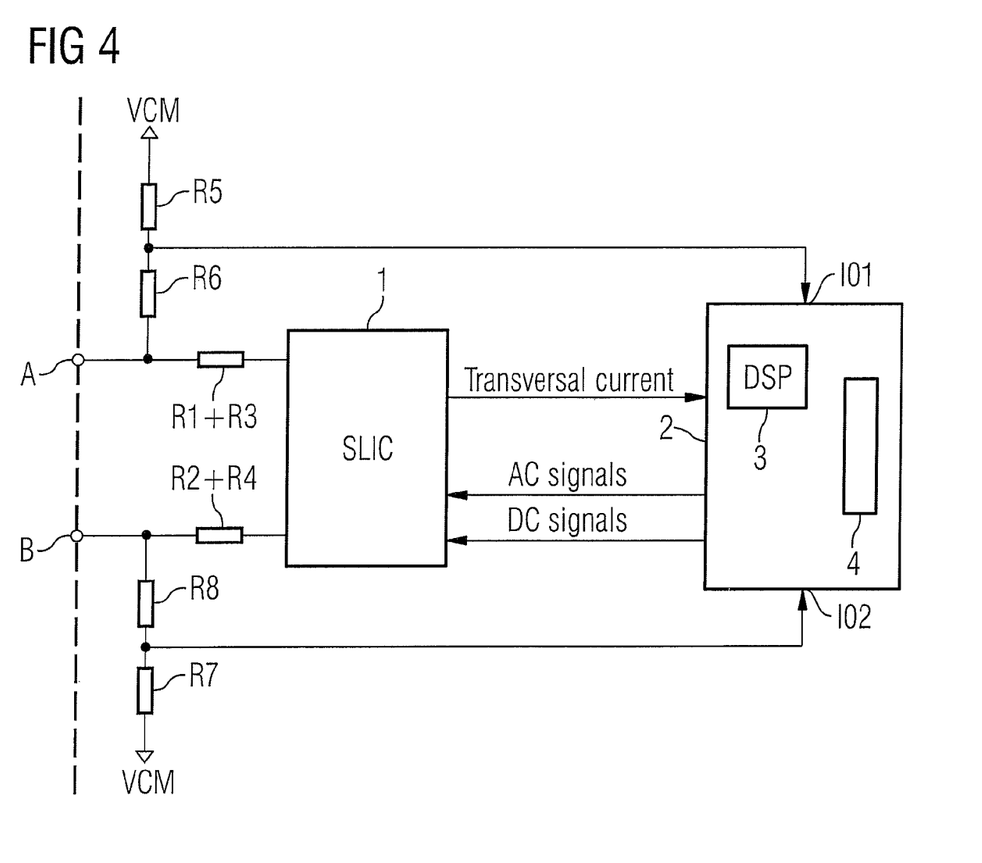
FIG. 4 illustrates a block diagram of one embodiment of one apparatus.

A corresponding embodiment is illustrated in FIG. 4, wherein a line card according to this embodiment is depicted.

In addition to SLIC 1 connected with tip line A and ring line B already described with reference to FIG. 1, a coder/decoder (CODEC) 2 is provided on the line card. The embodiment of FIG. 4 makes use of the fact that SLICs like SLIC 1 in FIG. 4 nowadays often have the capability of generating voltages and currents and measuring currents, whereas many CODECs have the capability of measuring voltages, for example via dedicated pins which in case of FIG. 4 are designated IO1 and IO2.

CODEC 2 in the embodiment illustrated in FIG. 4 comprises a digital signal processor 3 having digital-to-analog and analog-to-digital conversion capabilities. Such a CODEC with a digital signal processor may be used to convert the measurement data provided by SLIC 1 to digital data for further processing and also to generate analog AC or DC voltages or current signals which are then output to tip line A and/or ring line B via corresponding line drivers in SLIC 1.

Furthermore, as indicated in FIG. 4, SLIC 1 according to the embodiment illustrated has the capability of measuring transversal currents (i.e., currents flowing via tip line A and ring line B). SLIC 1 may further have the capability of also measuring longitudinal currents, which are measured only on tip line A or only on ring line B. However, for many embodiments, this capability is not necessary.

As also illustrated in FIG. 4, resistors R5 and R6 on the one hand and R7 and R8 on the other hand serve as voltage dividers and are correspondingly connected with pin IO1 and IO2 of CODEC 2. These voltage dividers enable also large voltages on tip line A or ring line B to be measured without overloading CODEC 2.

As already explained before, the line card may comprise more than one such SLIC/CODEC combination, in particular a plurality of these combinations so that a plurality of pairs of tip line and ring line may be connected to the respective line card. Furthermore, a plurality of line cards may be installed in a host like also illustrated in FIG. 2. The host is provided with data processing capabilities for controlling the line cards. For communicating with such a host, an interface 4 is provided in CODEC 2. For carrying out the measurements necessary in the embodiments, according to an embodiment, a corresponding software is downloaded to a memory of the host or on the line card directly such that when the software is run, the line card of the embodiment of FIG. 4 is controlled such that the corresponding measurements and calculations are performed.

The embodiment of FIG. 4 and similar embodiments are easy to realize because line cards already present are used for carrying out embodiments, such that no additional hardware is needed. In embodiments, it is sufficient to download a corresponding measurement software into a firmware memory of the host or of the line card in order to be able to control the line card accordingly.

Figure 5:
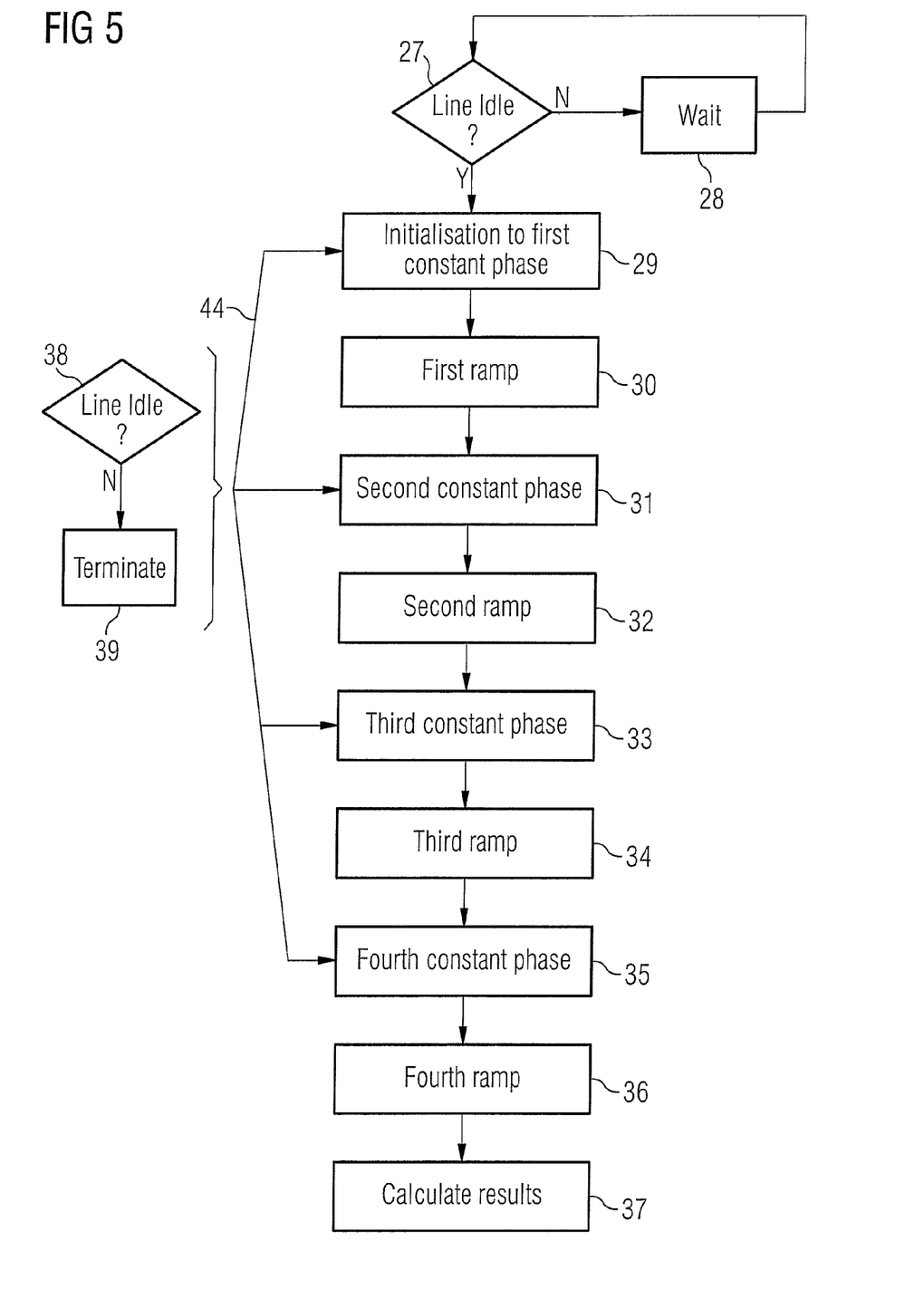
FIG. 5 illustrates a flow diagram of one embodiment of a method.
Figure 6:
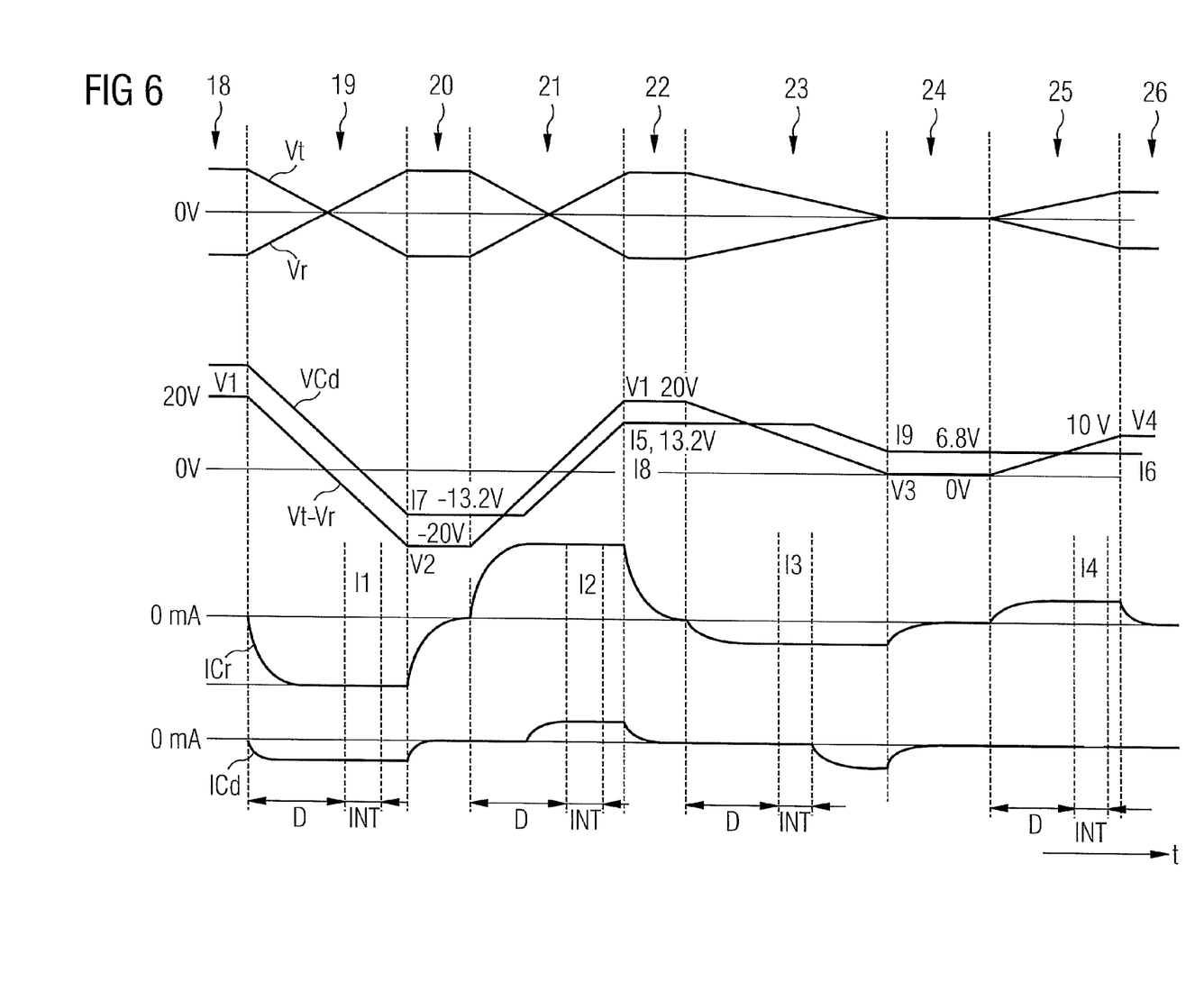
FIG. 6 illustrates voltage and current curves occurring during an exemplary execution of the method embodiment of FIG. 5.

Next, a more detailed embodiment of a method will be described with reference to FIGS. 5 and 6, wherein FIG. 5 illustrates a flow diagram of the method embodiment and FIG. 6 illustrates the corresponding voltages and currents for the method embodiment. At 27, the line to be tested is checked to determine if the line is in an idle state. An idle state in this case designates a state in which a telephone or a similar terminal device on far end of the line is not active (i.e., in the on-hook state mentioned above). In the on-hook state a telephone has a large capacity Cr (see FIG. 1), and consequently no DC current flows even if a voltage is applied to the line, for example a voltage of 48 V which is a standard voltage between tip line A and ring line B for PSTN systems and which voltage usually provides a power supply for the terminal device. On the other hand, if the line is not idle (i.e., in an off-hook state) a significant DC current may be detected when such a voltage is applied since in this case, for example in the termination 6 in FIG. 1, the diodes Do1 are conducting. Therefore, by applying such a voltage, it may be easily detected if the line is in an on-hook state or in an off-hook state. If the line is not idle, at 28 a wait is performed for a certain time, for example half an hour, and then step 27 is repeated. This ensures that the line testing which follows is not performed while a terminal device like a telephone is used since the test procedure could interrupt or disturb, for example a conversation between the user of the telephone device. Steps 27 and 28 may also be omitted if it desired to perform the test in any case respective of whether a telephone is used or not.

If the line is found to be idle at 27, at 29 an initialization to a first constant phase is performed. In other words, the voltage on tip line A and ring line B (in case of the communication system illustrated in FIGS. 1-3) is ramped to a first defined state from the current state of the line. The current state in this respect is determined by the activities performed on the line before the procedure of FIG. 5 is run.

The first constant phase achieved is illustrated in a section 18 in FIG. 6. For the voltages and currents in FIG. 6, it is assumed that a DSL signature and a telephone in an on-hook state are present, in other words that the tip line A and ring line B are terminated by termination 5 and signature 7 illustrated in FIG. 1 connected in parallel.

The voltage Vt on the tip line and the voltage Vr on the ring line are illustrated in the first or topmost graph of FIG. 6. The voltage difference Vt–Vr and the voltage VCd across the capacitance Cd of DSL signature 7 of FIG. 1 are illustrated in the second or middle graph of FIG. 6. Finally, a current ICr flowing across the capacitance Cr of termination 5 of FIG. 1 and a current ICd flowing across the capacitance Cd are illustrated at the bottom of FIG. 6, in a third graph. In this respect, it is assumed that in the illustrated embodiment signature 7 is a standard DSL signature with the Zener diodes Dd having breakthrough voltages of 6.8 V each.

As illustrated, to assume the first constant phase at 29 in FIG. 5, the voltage difference Vt–Vr is ramped to the value of 20 V. Furthermore, in the illustrated embodiment, Vt and Vr are set such that Vt=–Vr. Therefore, during the first constant phase in section 18 of FIG. 6, Vt=10 V and Vr=–10 V.

The voltage VCd in this first constant phase depends on the "history" (i.e., on previous operations performed on the line card) and therefore may assume other values than the one depicted in FIG. 6.

In the graphs in FIG. 6 and the corresponding analysis, it is assumed that the resistor Rd of signature 7 of FIG. 1 is 0 (instead of 33 kΩ in a standard DSL signature), and that the forward voltage drop of the Zener diodes Dd (i.e., the voltage which drops across the diode biased in forward bias) is 0 V instead of typically 0.4 to 0.6 V. However, these simplifications do not change the general behavior of the circuit which is used for determining whether a DSL signature is present.

During the first constant phase, as soon as a steady state is achieved ICr and ICd assume a value of 0 since with a constant voltage basically no current flows across the capacitors.

After 29 in FIG. 5, at 30 a first voltage ramp is performed which is depicted in section 19 of FIG. 6. In this voltage ramp, the voltage is ramped from the initial voltage Vt–Vr=V1 to a second voltage V2. In general, for the measurements to be performed in the illustrated embodiment, V1–V2 should be greater than two times the Zener voltage of the Zener diodes Dd, in the present case V1–V2>2·6.8 V=13.6 V.

In the illustrated embodiment V2 is chosen to be –V1 (i.e., –20 V) and a slope of the ramp may of example be chosen as 200 V/s such that the ramp from V1 to V2 is completed in 0.2 s. During this first ramp depicted in section 19 of FIG. 6, correspondingly Vt is ramped to –10 V and Vr is ramped to +10 V.

As further illustrated, VCd basically follows the change of Vt–Vr.

Through the change of the applied voltage, a current flows over the capacitances Cr and Cd as depicted in the lower part of FIG. 6.

In particular, since the voltages applied are large enough such that the corresponding Zener diodes are conducting, both a current ICr and a current ICd flows. Since the slope of Vt–Vr is constant and the current flowing across a capacitance is approximately determined by $$I = C \times \frac{dV}{dT} \quad (1)$$

wherein I is the current flowing, C is the respective capacitance (Cr or Cd in the present case) and dV/dT is the derivative of the applied voltage with respect to time (i.e., the slope of the voltage ramp). As illustrated in FIG. 6, constant currents ICr and ICd are reached after a certain onset time which depends on the capacitance and also on resistances connected thereto.

After a time D longer than the onset time, a current I1 is measured which is the transversal current flowing via tip line A and ring line B as explained above. For a more precise measurement, an integration over a certain integration time INT is performed.

The onset behavior of the currents ICr and ICd as well as their decaying behavior is determined by $$I(t) = I_s \cdot (1 - \exp(-t/T)) \quad (2)$$

for the onset and $$I(t) = I_s \exp(-t/T) \quad (3)$$

for the decaying, wherein I(t) is the respective current (ICr or ICd) depending on time, Is is the final or steady state value as assumed at the end of section 19 or section 21 of FIG. 6 for the respective currents, t is the time and T is the time constant of the system which may be calculated according to $$T = (Cr + Cd) \cdot Rr \quad (4)$$

which simplifies to $$T = Cr \cdot Rr \quad (5)$$

assuming that Cr>>Cd which is the case for standard DSL signatures and typical on-hook terminations of telephones.

After 30 in FIG. 5, at 31 the applied voltage is kept constant during a second constant phase which is illustrated in section 20 of FIG. 6. In other words, the voltage difference between tip line and ring line Vt–Vr is held at V2. In this case, the voltage VCd assumes a constant value of V2 less the breakthrough voltage of one Zener diode, in the example given where V2 is –20 V and the Zener voltage is 6.8 V VCr would be –13.2 V.

The exact behavior of VCd in section 19 depends on its starting value, which as explained above, depends on the history.

During the second constant phase of section 20, the currents ICr and ICd drop to 0 with their respective time constants since the voltage over the respective capacitors is not varied and therefore, according to equation (1), no current flows.

After 31, at 32 a second voltage ramp is performed from V2 to the initial state V1 which is depicted in section 21 of FIG. 6. The same slope, but with a different sign, as in step 30 is used in the illustrated embodiment. In other words, the ramp performed at 32 is the opposite of the ramp performed at step 30.

During this ramp, VCd at first stays constant at −13.2 V until Vt−Vr has changed by more than twice the Zener voltage of 6.8 V (Vt−Vr=−6.4 V in the present case). In this respect, it has to be taken into account that the current flowing via the capacitors is determined by the slope of the voltage ramp and in particular the direction of the current is determined by the sign of the ramp, whereas the voltage drop over the Zener diodes and its direction is primarily dependent on the voltage momentarily applied and the sign wherein which, for example at the beginning of the ramp in section 21, is negative while the slope of the ramp is positive, such that the change of Vt−Vr has to be twice the Zener voltage before VCd changes.

In this respect, a similar effect would be observed during the first ramp in section 19 if VCd had an appropriate starting voltage.

The varying voltage again causes a current to flow over the capacitors Cr and Cd, wherein the onset of current ICr coincides with the beginning of the ramp, whereas the onset of ICd corresponding with the beginning of the change of the voltage VCd.

At and near the end of section 21, stationary currents are flowing both across Cr and Cd. After a delay D which may be the same as delay D in section 19 for reasons explained later, a current I2 is measured during an integration time INT.

After 32, at 33 the applied voltage V1 is held constant during a third constant phase at 33 which is depicted in section 22 of FIG. 6. The behavior in section 2 is similar to the behavior illustrated in section 20 (i.e., VCd assumes a value of V1 less the Zener voltage) in the example given a value of 13.2 V, and ICr and ICd drop to 0 as determined by the time constant of the system.

After the third constant phase at 33, a third ramp is performed at 34 which is illustrated in section 23 of FIG. 6.

In contrast to the first ramp and the second ramp at 30 and 32, an end voltage V3 which is smaller than the voltage used in the first ramp (i.e., V2) is used. Still, V1−V3>2·6.8 V (the Zener voltage) should be maintained. In the illustrated embodiment, V3=0 V with a slope of 50 V/s is used.

The behaviour of VCd is similar to the one for the first ramp with reversed sign (i.e., VCd stays constant at 13.2 V until Vt−Vr has changed by more than twice the Zener voltage and then starts to decrease). Since the slope of the third ramp is considerably less than the slope of the first and second ramps, VCd stays constant for a longer time than during the second constant phase.

In particular, since VCd stays constant for a longer time and during constant phase no current ICd flows, the current ICr at least approximately reaches its steady state before the onset of ICd. After a delay D from the beginning of the third ramp, a current I3 is measured such that the corresponding integration time INT is finished before the onset of ICd. In other words, I3 is determined by ICr, but not by ICd.

After the third ramp at 34 in FIG. 5, at 35 the voltage is held constant in a fourth constant phase 35 depicted in section 24 of FIG. 6. During this constant phase, the current ICr drops to 0. Furthermore, the voltage VCd assumes a constant voltage of 6.8 V (i.e., the Zener voltage). Correspondingly, the voltage across the Zener diode Dd which is reverse biased is −6.8 V such that the overall voltage over the signature 7 is V3=0 V. Since the voltage across the Zener diode is −6.8 V (or very slightly below), the Zener diode is non-conducting and the charge on capacitance Cr responsible for the voltage of 6.8 V may not discharge.

After the fourth constant phase at 35, at 36 a fourth ramp is performed. This ramp starts from voltage V3 and leads to a larger voltage V4 such that V4−V3<2·6.8 V (the Zener voltage of diodes Dd). In the illustrated embodiment, V4=10 V. The slope of the fourth ramp in the illustrated embodiment has the same magnitude, but the opposite sign from the slope of the third ramp (i.e., 50 V/s).

In this case, because of the effect of the Zener diodes Dd, the charge on the capacitance Cd and therefore the voltage VCd remains constant and correspondingly no current ICd flows. On the other hand, no such effect is present for the termination 5 of FIG. 1, such that a current ICr flows over the capacitance Cr, which is measured as current I4 after a delay D over an integration time INT.

With this measurement, the measurements required for the embodiment of FIG. 5 are terminated. Section 26 illustrates that the voltage is kept constant after this, however, further measurements for other purposes like the determination of leakage capacitances and resistances may also follow.

After 36, at 37 the results are calculated. Before explaining this calculation in more detail, it is to be noted that a check like at 27 and 28 may be performed also during the execution, as indicated at 38 and arrows 44, for example during the constant phases. In this case, the method is terminated at 39 to be resumed later in order not to disturb a user of the communication line when for example making a telephone call. However, this check may also be omitted in embodiments.

In the following, the calculations performed at 37 are discussed. In the following, S1 designates the slopes of the first ramp and the second ramp (200 V/s in the example given), and S2 designates the slope of the third ramp and the fourth ramp (50 V/s in the example given).

In this case, the measured currents I1 and I2 are basically given by equation (1). However, in practice offset currents may flow which influence the measurement, such that I1 and I2 are determined as $$I1 = -C_{tot} \cdot S1 + I_{off} \quad (6)$$

$$I2 = C_{tot} \cdot S1 + I_{off}. \quad (7)$$

wherein Ioff designates an offset current and Ctot includes both Cr and Cd according to $$C_{tot} = Cr + Cd \quad (8)$$

from equations (6) and (7), Ctot may be calculated as $$C_{tot} = (I2 - I1)/(2 \cdot S1) \quad (9)$$

As can be seen, through performing two measurements at two ramps like the first ramp and the second ramp, the offset current Ioff may be cancelled out.

On the other hand, as already explained, the voltages and slopes in the third and fourth ramp are chosen such that the voltage across Cd does not change over a considerable part of the ramp or the whole ramp in the case of the fourth ramp such that no DC current flows across Cd and the measured current I3, I4 is only determined by Cr. In particular, in the third ramp of section 23, the voltage VCd will start from the initial value of 30.2 V just after Vt−Vr comes below 20−2·6.8V=6.4V. With a ramp slope S2 of 50 V/s, this means that the current measurement for measuring current I3 has to be executed within the first (2·6.8/50) s=0.272 s. For the measurement of I3 and I4, similar to equations (6) and (7) the following equations determine I3 and I4:

$$I3 = -Cr \cdot S2 + Ioff \quad (10)$$

$$I4 = Cr \cdot S2 + Ioff \quad (11)$$

and, similar to equation (8), Cr is then calculated according to $$Cr = (I4 - I3)/(2 \cdot S2) \quad (12)$$

finally, the capacitance Cd of the signature 7 can be calculated from equations (8), (9), and (12) according to $$Cd = Ctot - Cr = (I2 - I1)/(2 \cdot S1) - (I4 - I3)/(2 \cdot S2) \quad (13)$$

Therefore, if Cd calculated in this way is approximately 475 nF (the standard capacitance in a DSL signature like the signature 7 of FIG. 1) it can be concluded that a DSL device is present. On the other hand, if no DSL device is present and therefore also no signature is present, during the first ramp and the second ramp the measured currents I1 and I2 are only determined by the capacitance Cr meaning that in this case Ctot=Cr in equation (8), such that in this case the result for Cd according to equation (13) is 0 within the measurement accuracy.

Regarding the measurement accuracy, using Cr in the equations illustrated constitutes a slight approximation since, as can be taken from FIG. 1, a leakage capacitance Ctr is connected in parallel to Cr. However, as long as no fault occurs this leak capacitance is usually much smaller than Cr and therefore negligible. Furthermore, Ctr would be added to Cr in all the equations and therefore would be cancelled out when calculating Cd according to equation (13).

With the values for V1 to V4 and S1 and S2 given above and a ringer load (termination 5) of one U.S. ring equivalent number meaning a capacitance Cr of 8 µF in series with a resistor Rr of 6980Ω, the currents I1 to I4 measured will be approximately $$\pm 200 \text{ V/s} \cdot (8 \text{ µF} + 470 \text{ nF}) = \pm 1.7 \text{ mA} \quad (14),$$

and the measured currents I3 and I4 will be approximately $$\pm 50 \text{ V/s} \cdot 8 \text{ µF} = \pm 0.42 \text{ mA} \quad (15)$$

with a standard DSL signature having a capacitance of 470 nF as already described. These currents may be easily measured with the embodiment of FIG. 4.

With the values given as an example for the embodiment of FIGS. 5 and 6, the first ramp and the second ramp each last 200 ms, the third ramp lasts 400 ms and the fourth ramp again lasts 200 ms. As already explained, the onset times of the currents are determined by the capacitances and also by the resistances. Therefore, the delays D are used for before measurement. For the values given above, a delay time of approximately 30 to 40 ms may be used.

In one embodiment, the delays D in sections 19, 21, 23, and 25 are all equal. In this case, by estimating the time constant T in equation (2), the calculation of Cr (see equation (12)) may be corrected according to $$CrC = Cr/(1 - \exp(-D/T)) \quad (16)$$

wherein CrC is the corrected value for Cr. This, as a matter of course, also makes the calculation Cd according to equation (13) more exact, and in principle a similar correction may be used for equation (9).

The detection whether an xDSL signature is effectively present may for example be performed by comparing Cd as calculated by equation (13) with a threshold value, for example a value of 200 nF. If Cd is greater than this threshold value, it is decided that a DSL signature and therefore a DSL device is present, otherwise is it decided that no such signature and device are present. As a matter of course, different threshold values may also be used, and in case a plurality of different signatures with different capacitances are used in a communication system, Cd may also be compared with more than one threshold value to determine different types of signatures.

If, as explained in the embodiment of FIG. 5, steps 27, 28, 38, and 39 are performed, it is made sure that the line is idle and therefore in an on-hook state. Consequently, termination 5 is present.

On the other hand, as already indicated these steps may be omitted. In this case, if the line is not idle and a corresponding telephone is in an off-hook state, instead of termination 5 of FIG. 1 termination 6 of FIG. 1 is present. In this case, Cd is the only capacitance (apart from the parasitic capacitance Ctr). On the other hand, via termination 6 an additional DC current may flow depending on the voltage Vt−Vr (but not on the slope of the ramps) which may disturb the measurements. However, by extending the method slightly such an off-hook termination may be detected and taken into account.

To achieve this, during the third constant phase at 31 and after the fourth ramp at 36, corresponding currents I5 and I6 are measured, I5 being measured in the third constant phase (section 22 of FIG. 6) and I6 being measured after the fourth ramp (section 26 of FIG. 6) in an embodiment. The measurements in one embodiment are performed near the end of the respective constant phases where any current flowing over a possibly present DSL signature 7 have decayed.

Therefore, the measured currents I are in this case determined by the current flowing via the off-hook termination 6 of FIG. 1 according to $$I = (V - Vz)/Ro1 \quad (17)$$

wherein I is the measured current (I5 or I6), V is the corresponding voltage (V1 or V4) and Vz is the Zener voltage of Zener diodes Do1 in FIG. 6. Therefore, Ro1 may be calculated according to $$Ro1 = (V1 - V4)/(I5 - I6) \quad (18)$$

and the Zener voltage Vz may be calculated according to $$Vz = V1 - I5 \cdot Ro1 = (I5 \cdot V4 - V1 \cdot I6)/(I5 - I6) \quad (19)$$

Figure 7:
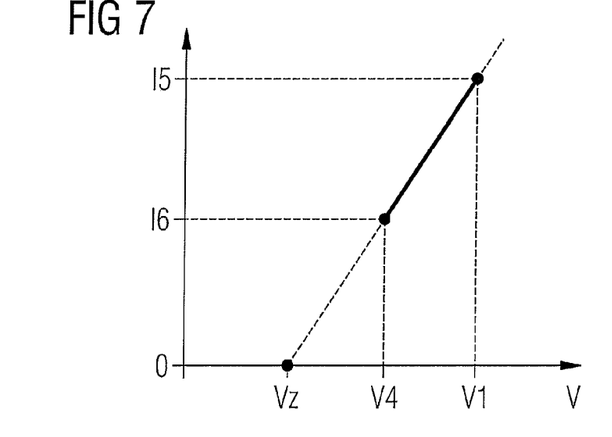
FIG. 7 illustrates a graph illustrating the measurement of a signature resistance according to one embodiment.

This calculation according to equations (17) and (18) is depicted FIG. 7.

If Vz calculated in this way is close to 0 V, for example <0.2 V, this means that the termination of the tip ring wires is a pure resistance. In this case, it is likely that the line is terminated with the shortcut meaning a "resistive fault" indication. In this case, the line may be shut down in order to repair the line.

In case of a high value for Ro1 and a not neglectable value for Cr calculated during the measurements according to equation (12) (e.g., Cr>100 nF), the line is terminated with the telephone in the on-hook state with a high probability within the measurement accuracy (i.e., not terminated by termination 6) but termination 5. On the other hand, if the value of Ro1 is not high-omic, for example in the MΩ range, the telephone is an off-hook state (termination 6 of FIG. 1).

Therefore, with the described extension of the measurements its also possible to determine the state of the telephone terminating the line.

The embodiments of FIGS. 5 and 6 may also be modified to additionally or alternatively detect signatures or terminations like the ones illustrated in FIGS. 3A and 3B. In general, corresponding embodiments use the fact that the current flowing via these terminations depends on the polarity of an applied DC voltage. In a corresponding embodiment based on the embodiments of FIGS. 5 and 6, a current I7 is measured during the second constant phase of step 31 (section 20 of FIG. 6), a current I8 is measured during the third constant phase at 33 (section 22 of FIG. 6), and current I9 is measured during the fourth constant phase at 35 (section 24 in FIG. 6). As explained before with reference to FIG. 7, in one embodiment, the currents are measured at or near the end of the respective constant phases to minimize the effect of the decaying currents flowing over the capacitances Cr and Cd. Furthermore, in the embodiment discussed since during the fourth constant phase of section 24 a voltage V3=0 V is applied, the measured current I9 basically corresponds to an offset current.

Based on these measurements, the following resistances Rp and Rn are calculated:

$$Rp=(V1-V3)/(I8-I9) \quad (20)$$

$$Rn=(V2-V3)/(I7-I9) \quad (21)$$

The resistance values Rp and Rn thus calculated are then compared with a low threshold value, for example 20 kΩ, and a high threshold value, for example 1 MΩ. If Rp exceeds the higher threshold value and is therefore to be considered high-omic and Rn is below the lower threshold value and therefore low-omic, a termination or signature is present wherein a diode is connected like in FIG. 3B, whereas if Rn exceeds the higher threshold value and Rp is below the lower threshold value, a diode is present like in FIG. 3A. On the other hand, if none of these two cases apply, for example if Rp and Rn are equal or almost equal within the measurement accuracy, no termination or signature like in FIGS. 3A and 3B is present.

The value of the lower threshold value in embodiments is chosen such that it exceeds Ro2 and Ro3 in FIG. 2 since, in case the voltage is applied such that the respective diode Do2 or Do3 is conducting, apart from the forward voltage of the diode mainly the resistance of Ro2 or Ro3 is measured.

As already explained, the methods described above may be executed with the embodiment of FIG. 4. In this case, in particular, required calculations and comparisons may be performed by digital signal processor 3, or the results may be written for example to a register and read out by a host (not illustrated) via interface 4. In this case, the processing may be performed by the host.

Figure 8:
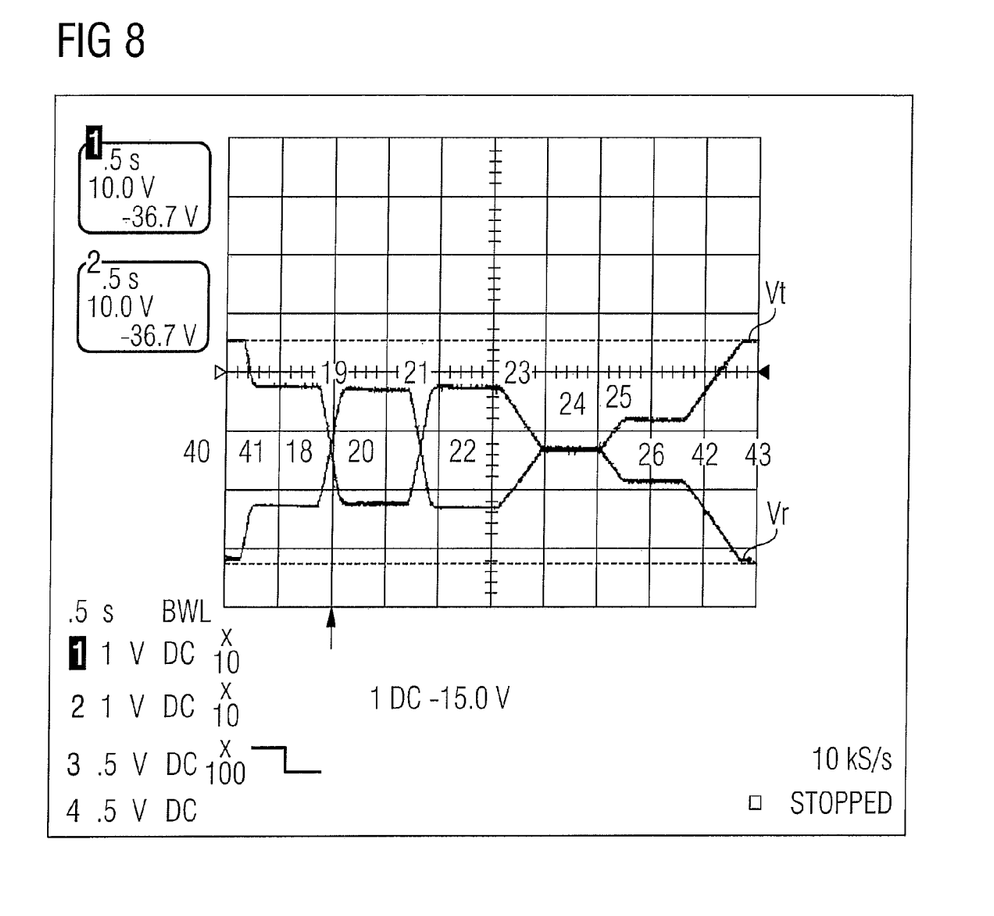
FIG. 8 illustrates an oscilloscope measurement during an exemplary execution of the method embodiment of FIG. 5.

FIG. 8 illustrates the voltage Vt applied to the tip line and the voltage Vr applied to the ring line of a communication line during an execution of an embodiment like the embodiments of FIGS. 5 and 6 as measured by an oscilloscope. In particular, sections 18-26 in FIG. 8 correspond to sections 18-26 in FIG. 6. Furthermore, the initialization to the first constant phase at 29 of FIG. 5 is illustrated in more detail in sections 40 and 41. In particular, when the method is started, some arbitrary voltages are applied to tip line and ring line, in the example illustrated Vt≈18 V and Vr≈−18 V. Therefore, in section 41 ramps are performed to bring the system to the first constant phase with defined voltage values. Furthermore, in the embodiment illustrated in FIG. 8 the initial values of section 40 are stored, and in section 42 a ramp is performed to bring Vt and Vr to the initial values such that section 43 corresponds to the situation of section 40. In this embodiment, no voltage steps but only ramps are present also from the initial arbitrary voltage to the first constant phase. In such an embodiment, no ringing noise or clicking noise or the like is induced in older mechanical telephones, whereas in embodiments with voltage steps such noise may be induced.

The present invention is not limited to the embodiments as described above, and numerous modifications are possible. For example, in the embodiments of FIGS. 5 and 6, separate voltage ramps are performed for measuring I1, I2, I3, and I4 which leads to a high precision of the measurement. On the other hand, it can be seen for example in the second voltage ramp of section 21 or the third voltage ramp of section 23 that during these ramps in a portion only a current via capacitance Cr flows, whereas in a different portion a current flows both via a capacitance Cr and capacitance Cd. Therefore, in a different embodiment two measurements may be performed within a single voltage ramp. For example, in a ramp like the third voltage ramp of section 23, a further measurement may be performed at or near the end of the voltage ramp where both ICr and ICd are non-zero. Such a measurement may for example replace the measurement in the first voltage ramp or the second voltage ramp. Therefore, it would be possible to shorten the measurement procedure. In particular, with a further voltage ramp being the reverse of the third voltage ramp, two further measurements may be performed in another embodiment and then the calculation according to equation (13) is performed. If precision is even less important, in yet another embodiment only a single ramp may be used. In this case, the current offset Ioff of equations (6), (7), (10), and (11) is not compensated, but the measurement may be performed even faster. As a matter of course, in these embodiments ramps where no measurements are performed may be omitted.

Furthermore, the specific values for voltages and currents given for the embodiments of FIGS. 5 and 6 may be varied. Also, the detection of various signatures or terminations has been discussed with reference to DSL signatures or the signatures or terminations of FIGS. 3A and 3B. However, if it is known beforehand that only a DSL signature 7 of FIG. 1 or no signature is present, in a corresponding embodiment only the steps for detecting DSL signature 7 have to be performed. The same holds true for the other terminations and signatures discussed.

Furthermore, the measurement and calculation steps presented do not have to be performed in the order illustrated. For example, in the embodiments of FIG. 6, the third and fourth voltage ramps for measuring I3 and I4 may be performed first, and after this the first and second voltage ramps for measuring I1 and I2. Also, the calculations presented in the various calculations may be performed, as illustrated in the embodiment of FIG. 5, after all the measurements, or may be performed as soon as the data for making a specific calculation has been measured.

The above modifications are only examples for the numerous modifications which may be performed, and further modifications apparent to persons skilled in the art are also considered to be within the scope of the embodiments of the present invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of testing a communication line, the method comprising:
    applying a voltage as a function of time on the communication line;
    measuring at least a first current and a second current flowing via the communication line, wherein the second current is measured at a different point in time than the first current; and deciding whether a given terminal element is connected to the communication line based on the first current and the second current.

2. The method according to claim 1, wherein the terminal element comprises at least one of a termination and a signature.

3. The method according to claim 1, wherein the terminal element comprises a non-linear element.

4. The method according to claim 3,
wherein the non-linear element comprises a diode;
wherein the measuring of the first current is performed at a point in time where the diode is forward biased by the voltage; and
wherein measuring the second current is performed at a point in time where the diode is reversed biased by the voltage.

5. The method according to claim 3,
wherein the non-linear element comprises a first Zener diode and a second Zener diode connected in series with opposite polarities;
wherein the first current is measured at a point in time wherein the voltage is at a level that causes the Zener diodes to conduct; and
wherein measuring the second voltage is performed at a point in time wherein the voltage is at a level which causes at least one of the Zener diodes to be non-conducting.

6. The method according to claim 1, wherein the function comprises at least one of a voltage ramp and at least one voltage plateau.

7. A method of testing a communication line, the method comprising:
applying a first voltage ramp to the communication line from a first voltage to a second voltage;
measuring a first current during the first ramp;
applying a second voltage ramp from the second voltage to a third voltage on the communication line;
measuring a second current during the second ramp;
applying a third voltage ramp from the third voltage to a fourth voltage on the communication line;
measuring a third current during the third voltage ramp;
applying a fourth voltage ramp from the fourth voltage to a fifth voltage on the communication line;
measuring a fourth current during that fourth ramp; and
deciding whether a given terminal element is present based on the first current, the second current, the third current, and the fourth current.

8. The method according to claim 7, wherein the given terminal element comprises a first breakthrough diode and a second breakthrough diode connected in series, wherein the first breakthrough diode has a reversed polarity compared to the first breakthrough diode.

9. The method according to claim 8,
wherein the first current and the second current are measured in a state wherein the first breakthrough diode and the second breakthrough diode are conducting; and
wherein the third current and the fourth current are measured in a state wherein at least one of the breakthrough diodes is non-conducting.

10. The method according to claim 8,
wherein at least one of the voltage difference between the first voltage and the second voltage, the second voltage and the third voltage, the third voltage and the fourth voltage, and the fourth voltage and the fifth voltage exceed the sum of the breakthrough currents of the first breakthrough diode and the second breakthrough diode; and wherein at least another one of the voltage difference between the first voltage and the second voltage, the second voltage and the third voltage, the third voltage and the fourth voltage, and the fourth voltage and the fifth voltage are smaller than the sum of the breakthrough currents of the first breakthrough diode and the second breakthrough diode.

11. The method according to claim 8, wherein the given terminal element comprises a capacitance, wherein a further terminal element connected to the communication line comprises a further capacitance, and wherein deciding whether the specified terminal element is present comprises:
calculating a value of the capacitance based on the first through fourth currents and on slopes of the first through fourth ramps.

12. The method according to claim 8, wherein the first breakthrough diode and the second breakthrough diode each comprise a Zener diode.

13. The method according to claim 7, wherein the first through fourth currents are measured after a predetermined delay time from the beginning of the respective first through fourth ramp.

14. The method according to claim 7, comprising:
applying constant voltages to the communication line between the first through fourth voltage ramps.

15. The method according to claim 14, comprising:
measuring at least two voltage/current couples at at least two different constant voltages of the constant voltages; and
calculating a value of a resistance connected in series with a pair of breakthrough diodes and connected to the communication line based on the first couple and the second couple.

16. An apparatus for testing a communication line, the apparatus comprising:
means for applying a voltage as a function of time on the communication line;
means for measuring at least a first current and a second current flowing via the communication line, wherein the second current is measured at a different point in time than the first current; and
means for determining whether a given terminal element is connected to the communication line based on the first current and the second current.

17. The apparatus according to claim 16,
wherein the terminal element comprises a diode;
wherein the measuring of the first current is performed at a point in time where the diode is forward biased by the voltage; and
wherein measuring the second current is performed at a point in time where the diode is reversed biased by the voltage.

18. The apparatus according to claim 16,
wherein the terminal element comprises a first Zener diode and a second Zener diode connected in series with opposite polarities;
wherein the first current is measured at a point in time wherein the voltage is at a value that causes the Zener diodes to conduct; and
wherein measuring the second voltage is performed at a point in time wherein the voltage is at a level that causes at least one of the Zener diodes to be non-conducting.

19. An apparatus configured to test a communication line, the apparatus comprising:
a voltage source configured to apply a first voltage ramp to the communication line from a first voltage to a second voltage, apply a second voltage ramp from the second voltage to a third voltage on the communication line, apply a third voltage ramp from the third voltage to a fourth voltage on the communication line, and apply a fourth voltage ramp from the fourth voltage to a fifth voltage on the communication line;

a current meter configured to measure a first current during the first voltage ramp, measure a second current during the second voltage ramp, measure a third current during the third voltage ramp, and measure a fourth current during the fourth voltage ramp; and a calculation unit configured to determine whether a given terminal element is present based on the first current, the second current, the third current, and the fourth current.

20. The apparatus according to claim 19, wherein the given terminal element comprises a first breakthrough diode and a second breakthrough diode in series, wherein the first breakthrough diode has a reversed polarity compared to the first breakthrough diode.

21. The apparatus according to claim 20, wherein the current meter is configured to measure the first current and the second current in a state wherein the first breakthrough diode and the second breakthrough diode are conducting, and measure the third current and the fourth current in a state wherein at least one of the breakthrough diodes is non-conducting.

22. The apparatus according to claim 20,
wherein at least one of the voltage difference between the first voltage and the second voltage, the second voltage and the third voltage, the third voltage and the fourth voltage, and the fourth voltage and the fifth voltage exceed the sum of the breakthrough currents of the first breakthrough diode and the second breakthrough diode; and
wherein at least another one of the voltage difference between the first voltage and the second voltage, the second voltage and the third voltage, the third voltage and the fourth voltage, and the fourth voltage and the fifth voltage are smaller than the sum of the breakthrough currents of the first breakthrough diode and the second breakthrough diode.

23. The apparatus according to claim 20,
wherein the given terminal element comprises a capacitance;
wherein a further terminal element connected to the communication line comprises a further capacitance; and
wherein the calculation unit is configured to calculate a value of the capacitance based on the first through fourth currents and on slopes of the first through fourth ramps.

24. A communication equipment comprising:
at least one line card, the at least one line card comprising a subscriber line interface circuit configured to couple to a communication line and a coder/decoder;
a programmable control unit coupled with the line card and comprising storage configured to store a program comprising a test procedure, wherein, when the test procedure is run, the programmable control unit is configured to control the subscriber line interface and the coder/decoder to perform the following:
apply a voltage as a function of time on the communication line;
measure at least a first current and a second current flowing via the communication line, wherein the second current is measured at a different point in time than the first current; and
decide whether a given terminal element is connected to the communication line based on the first current and the second current.

25. The communication equipment according to claim 24, wherein the terminal element comprises at least one of a termination and a signature.

26. The communication equipment according to claim 24, wherein the terminal element comprises a non-linear element.

27. The communication equipment according to claim 26, wherein the non-linear element comprises a diode;
wherein the measuring of the first current is performed at a point in time where the diode is forward biased by the voltage; and
wherein the measuring of the second current is performed at a point in time where the diode is reversed biased by the voltage.

28. The communication equipment according to claim 26,
wherein the non-linear element comprises a first Zener diode and a second Zener diode connected in series with opposite polarities;
wherein the first current is measured at a point in time wherein the voltage is at a level that causes the Zener diodes to conduct; and
wherein measuring the second voltage is performed at a point in time wherein the voltage is at a level that causes at least one of the Zener diodes to be non-conducting.

29. The communication equipment according to claim 28, wherein the function comprises at least one of a voltage ramp and a voltage plateau.

30. A communication equipment comprising:
at least one line card, the at least one line card comprising a subscriber line interface circuit configured to couple to a communication line and a coder/decoder;
a programmable control unit coupled with the line card and comprising storage configured to store a program comprising a test procedure, wherein, when the test procedure is run, the programmable control unit is configured to control the subscriber line interface and the coder/decoder to perform the following:
apply a first voltage ramp to the communication line from a first voltage to a second voltage;
measure a first current during that first ramp;
apply a second voltage ramp from the second voltage to a third voltage on the communication line;
measure a second current during the second ramp;
apply a third voltage ramp from the third voltage to a fourth voltage on the communication line;
measure a third current during the third ramp;
apply a fourth voltage ramp from the fourth voltage to a fifth voltage on the communication line;
measure a fourth current during that fourth ramp; and
decide whether a given terminal element is present based on the first current, the second current, the third current, and the fourth current.

31. The communication equipment according to claim 30,
wherein the specified terminal element comprises a first breakthrough diode and a second breakthrough diode in series with the first breakthrough diode and with reversed polarity compared to the first breakthrough diode;
wherein the first current and the second current are measured in a state wherein the first breakthrough diode and the second breakthrough diode are conducting; and
wherein the third current and the fourth current are measured in a state wherein at least one of the breakthrough diodes is non-conducting.

32. The communication equipment according to claim 31, wherein at least one of the voltage difference between the first voltage and the second voltage, the second voltage and the third voltage, the third voltage and the fourth voltage, and the fourth voltage and the fifth voltage exceed the sum of the breakthrough currents of the first breakthrough diode and the second breakthrough diode; and wherein at least one of the voltage difference between the first voltage and the second voltage, the second voltage and the third voltage, the third voltage and the fourth voltage, and the fourth voltage and the fifth voltage are smaller than the sum of the breakthrough currents of the first breakthrough diode and the second breakthrough diode.

33. The communication equipment according to claim 30, wherein the terminal element comprises a capacitance;

wherein a further terminal element connected to the communication line comprises a further capacitance; and wherein the deciding whether the specified terminal element is present comprises calculating a value of the capacitance based on the first through fourth currents and on slopes of the first through fourth ramps.

34. The communication equipment according to claim 30, wherein the first through fourth currents are measured after a predetermined delay time from the beginning of the respective first through fourth ramp.

35. The communication equipment according to claim 30, wherein, when the test procedure is run, the programmable control unit is configured to control the subscriber line interface and the coder/decoder to perform the following:

apply constant voltages between the first through fourth voltage ramps;

measure at least two voltage/current couples at at least two different plateaus of the plateaus; and calculate a value of a resistance connected in series with a pair of breakthrough diodes and connected to the communication line based on the first couple and the second couple.

* * * * *